US006212299B1

(12) United States Patent
Yuge (10) Patent No.: US 6,212,299 B1
(45) Date of Patent: *Apr. 3, 2001

(54) METHOD AND APPARATUS FOR RECOGNIZING A CHARACTER

(75) Inventor: Ryoichi Yuge, Oonojo (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/816,182

(22) Filed: Mar. 12, 1997

Related U.S. Application Data

(63) Continuation-in-part of application No. 08/429,297, filed on Apr. 25, 1995, now abandoned, and application No. 08/164,939, filed on Dec. 10, 1993, now abandoned.

(30) Foreign Application Priority Data

Dec. 11, 1992 (JP) .................................................... 4-331516

(51) Int. Cl.$^7$ ........................................................ G06K 9/72
(52) U.S. Cl. .................................... 382/231; 382/229
(58) Field of Search ..................................... 382/177, 178, 382/216, 229, 230, 231, 292, 185

(56) References Cited

U.S. PATENT DOCUMENTS

| 4,610,025 |   | 9/1986  | Blum et al.      | 382/229 |
| 4,654,873 | * | 3/1987  | Fujisawa et al.  | 382/178 |
| 4,850,025 | * | 7/1989  | Abe              | 382/117 |
| 4,907,283 |   | 3/1990  | Tanaka et al.    | 382/176 |
| 4,972,499 |   | 11/1990 | Kurosawa         | 382/227 |
| 5,048,113 |   | 9/1991  | Yamagata et al.  | 382/310 |
| 5,050,224 | * | 9/1991  | Mori             | 382/216 |
| 5,131,053 |   | 7/1992  | Bernzott et al.  | 382/176 |
| 5,161,245 | * | 11/1992 | Fenwick          | 382/177 |
| 5,177,793 |   | 1/1993  | Murai et al.     | 382/219 |
| 5,325,444 |   | 6/1994  | Cass et al.      | 382/177 |
| 5,335,289 |   | 8/1994  | Abdelazim        | 382/177 |
| 5,341,438 | * | 8/1994  | Clifford         | 382/179 |
| 5,583,949 | * | 12/1996 | Smith et al.     | 382/199 |
| 5,610,025 | * | 3/1997  | Blum et al.      | 382/177 |
| 5,649,027 | * | 7/1997  | Mahajan et al.   | 382/185 |

FOREIGN PATENT DOCUMENTS 62-75785    4/1987  (JP) .
63-136291 * 10/1988  (JP) .

* cited by examiner

Primary Examiner—Amelia Au
Assistant Examiner—Samir Ahmed (57) ABSTRACT

A document with a plurality of characters is read, a binary document image is produced, and a character rectangle circumscribed about a mass of black pixels connected with each other (called a black-pixel mass) is produced for each black-pixel mass. The character rectangles are classified into a plurality of groups on condition that one or more character rectangles in one group are circumscribed about one or more black-pixel masses having the same character pattern. The character rectangles in each group are circumscribed about images of the same character. Thereafter, a figure feature of a representative character image in each classified group of character rectangles is compared with each of referential character patterns. Therefore, the character images for the character rectangles circumscribing one of non-separating characters are recognized as one non-separating character. Also, a pair of non-recognized character rectangles close to each other in an upper/lower positional relationship are unified to produce a unified character rectangle. Therefore, a character image for the unified character rectangle is recognized as one separating character "i" or "j". Therefore, even though an error exists in the document, the error is not recognized, and the recognized character images are displayed to reproduce the document.

1 Claim, 7 Drawing Sheets

| CHARACTER RECTANGLE NUMBER | COORDINATE DATA | | | |
|---|---|---|---|---|
| | X COORDINATE | WIDTH $\Delta X$ | Y COORDINATE | HEIGHT $\Delta Y$ |
| C1 | 0.8 | 2.8 | 1.8 | 3.8 |
| C2 | 1.3 | 2.8 | 1.3 | 5.5 |
| C3 | 1.9 | 2.8 | 1.3 | 5.5 |
| ⋮ | ⋮ | ⋮ | ⋮ | ⋮ |

| CHARACTER IMAGE GROUP NUMBER | CHARACTER RECTANGLE NUMBER |
|---|---|
| (1) | C1, C8 |
| (2) | C2, C3, C9, C11 |
| (3) | C4 |
| (4) | C5, C10, C15 |
| (5) | C6 |
| (6) | C7 |
| (7) | C12 |
| (8) | C13 |
| (9) | C14 |
| (10) | C16 |

FIG. 9

| CHARACTER IMAGE GROUP NUMBER | JUDGEMENT | RECOGNIZED CHARACTER | CHARACTER RECTANGLE NUMBER |
|---|---|---|---|
| (1) | RECOGNIZED | "a" | C1, C8 |
| (2) | RECOGNIZED | "p" | C2, C3, C9, C11 |
| (3) | RECOGNIZED | "ℓ" | C4 |
| (4) | RECOGNIZED | "e" | C5, C10, C15 |
| (5) | RECOGNIZED | "g" | C6 |
| (6) | RECOGNIZED | "r" | C7 |
| (7) | UNRECOGNIZED | | C12 |
| (8) | UNRECOGNIZED | | C13 |
| (9) | RECOGNIZED | "n" | C14 |
| (10) | UNRECOGNIZED | | C16 |

FIG. 10

| CHARACTER IMAGE GROUP NUMBER | JUDGEMENT | RECOGNIZED CHARACTER | CHARACTER RECTANGLE NUMBER |
|---|---|---|---|
| (1) | RECOGNIZED | "a" | C1, C8 |
| ⋮ | ⋮ | ⋮ | ⋮ |
| (6) | RECOGNIZED | "r" | C7 |
| (9) | RECOGNIZED | "n" | C14 |
| (10) | UNRECOGNIZED | | C16 |
| (11) | RECOGNIZED | "i" | C17 |

FIG. 11

| C1 | C2 | C3 | C4 | C5 |
|----|----|----|----|----|
| "a" | "p" | "p" | "ℓ" | "e" |
| C6 | C7 | C8 | C9 | C10 |
| "g" | "r" | "a" | "p" | "e" |
| C11 | C17 | C14 | C15 | |
| "p" | "i" | "n" | "e" | |

FIG. 12

| CHARACTER IMAGE GROUP NUMBER | INFORMATION | CONFIRMED CHARACTER | CHARACTER RECTANGLE NUMBER |
|---|---|---|---|
| (1) | CONFIRMED | "a" | C1, C8 |
| (2) | CONFIRMED | "p" | C2, C3, C9, C11 |
| (3) | CONFIRMED | "ℓ" | C4 |
| (4) | CONFIRMED | "e" | C5, C10, C15 |
| (5) | CONFIRMED | "g" | C6 |
| (6) | CONFIRMED | "r" | C7 |
| (9) | CONFIRMED | "n" | C14 |
| (11) | CONFIRMED | "i" | C17 |

METHOD AND APPARATUS FOR RECOGNIZING A CHARACTER

CROSS-REFERENCES TO RELATED APPLICATIONS

This application is a continuation-in-part of U.S. patent application Ser. No. 08/429,297 filed on Apr. 25, 1995, now abandoned and U.S. patent application Ser. No. 08/164,939, filed on Dec. 10, 1993, now abandoned.

BACKGROUND OF THE INVENTION

1. Field of the Invention

The present invention relates generally to method and apparatus for recognizing a character written in a document image.

2. Description of the Related Art

In recent years, demands have been increasing on used of an apparatus for recognizing characters as an input unit of computer. Especially, an apparatus for quickly and accurately recognizing characters is indispensable for improvement of computer performance.

2.1. Previously Proposed Art

A conventional apparatus for recognizing characters is described with reference to FIG. 5.

Figure 5:
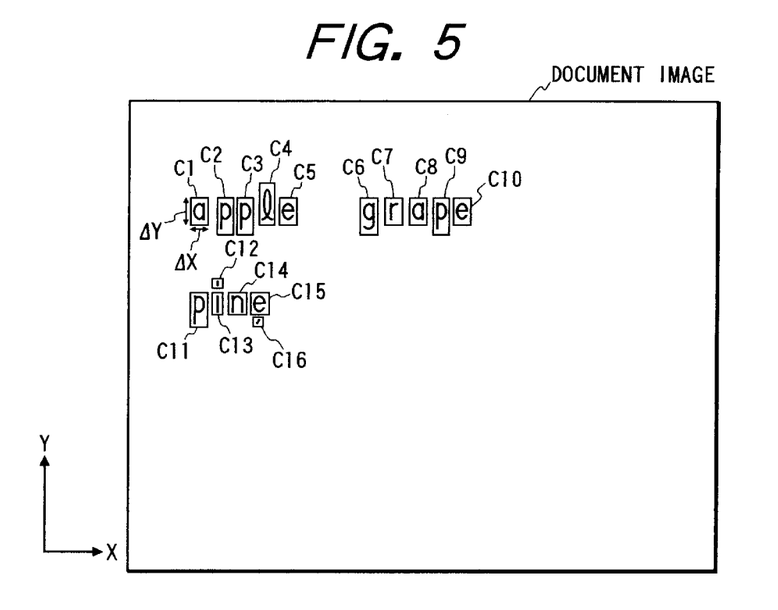
FIG. 5 shows an example of a binary document image obtained from an image scanner (not shown) for reading a document in which a plurality of characters are written.

FIG. 5 shows an example of a binary document image obtained from an image scanner (not shown) for reading a document in which a plurality of characters are written.

A document, in which a plurality of characters are written or printed, is read by the image scanner as a binary document image, and the binary document image read by the image scanner is stored in an image storing unit. The binary document image is composed of a plurality of pieces of pixel data consisting of white and black pixels and position data of the pixels in X–Y co-ordinates.

In the specification and drawings, successive black and white pixels are structured by connecting a plurality of black and white pixels, respectively. That is, each character is represented by one or more successive black pixel masses of black pixels.

Therefore, a black region in the document is represented by the successive black pixels. In other words, the black region is defined as a region where a region of the characters is excepted from all of the document region.

Also, a character rectangle circumscribed about successive black pixels is virtually obtained by a circumscribed rectangular detecting unit.

Prior to the recognition of the binary document image, in cases where a plurality of character rectangles are located within a predetermined distance from each other, this conventional recognition apparatus unifies the character rectangles to form a unified character rectangle, and the unified character rectangle is regarded as a single character rectangle. Thereafter, the conventional apparatus recognizes one mass of successive black pixels in the character rectangle and one or more masses of successive black pixels in the unified character rectangle as one character, respectively.

Therefore, since a non-separating character such as "a", "b", "c", "d", "e", "f", "g", "h" or the like is structured by a single mass of successive black pixels connected with each other, the conventional apparatus recognizes the non-separating character without the above unification of a plurality of the character rectangles.

On the other hand, since a separating character such as "i", "j" or the like is structured by a plurality of masses of the successive black pixels, the conventional apparatus recognizes the separating character by the above unification.

Concretely, as shown in FIG. 5, since character rectangles C12 and C13 are located within a predetermined distance from each other, these character rectangles are unified together and the conventional apparatus recognizes masses of successive black pixels in the character rectangles C12 and C13 as a single character "i".

2.2. Problems to be Solved by the Invention

However, as shown in FIG. 5, in a case of that such a noise as "," in a character rectangle C16 exists or occurs in the document or the document image read by the scanner, respectively, the conventional apparatus unifies a character rectangle C15 and a character rectangle C16. As a result, a mass of successive black pixels in the character rectangle C15 is not recognized as a character "e".

Furthermore, it is well-known that such a noise as "," often occurs from several kinds of causes.

Therefore, there is a drawback that a character written in the document is not reliably recognized.

SUMMARY OF THE INVENTION

An object of the present invention is to provide, with due consideration to the drawbacks of such a conventional method and a conventional apparatus for recognizing a character, method and apparatus in which a character is accurately and reliably recognized even though a noise exists in a position close to a character.

The object is achieved by the provision of an apparatus for recognizing a character written in a document, comprising:

image reading means for reading an image of the document to obtain a document image indicated by a plurality of black pixels and a plurality of white pixels;

character rectangle producing means for extracting a plurality of black-pixel masses, respectively composed of a plurality of black pixels connected with each other, from the document image obtained by the image reading means and producing a plurality of character rectangles respectively circumscribed about one black-pixel mass;

character pattern classifying means for comparing character images of the black-pixel masses, about which the character rectangles produced by the character rectangle producing means are circumscribed, with each other, and classifying one or more black-pixel masses, of which the character images have the same character pattern, into a character group for each character pattern to classify each of the black-pixel masses extracted by the character rectangle producing means into one of the character patterns;

representative character image determining means for determining a representative character image of a representative black-pixel mass representing the character images of the black-pixel masses classified into the same character group by the character pattern classifying means, for each of the character groups;

figure feature detecting means for detecting a figure feature of one representative character image of one representative black-pixel mass determined by the representative pattern determining means, for each of the representative character images;

referential figure feature storing means for storing a plurality of referential figure features of a plurality of referential character patterns which each express a character;

character recognizing means for comparing one figure feature of one representative character image detected by the figure feature detecting means with each of the referential figure features stored in the referential figure feature storing means for each of the figure features of the representative character images, detecting a particular referential character pattern as a character pattern agreeing with one representative character image for each of the representative character images in cases where a particular referential figure feature of the particular referential character pattern agrees with the figure feature of the representative character image and recognizing each of the character images of the black-pixel masses classified into the character group, which corresponds to the representative character image agreeing with the particular referential character pattern, as a character expressed by the particular referential character pattern;

character rectangle unifying means for selecting a first character rectangle and a second character rectangle from a group of the character rectangles reproduced by the character rectangle producing means, on condition that either a first character image of a first black-pixel mass about which the first character rectangle is circumscribed or a second character image of a second black-pixel mass about which the second character rectangle is circumscribed is not recognized as any character by the character recognizing means and the first and second character rectangles are close to each other within a predetermined character distance, unifying the first and second character rectangles to a unified character rectangle circumscribed about the first and second black-pixel masses while maintaining positions of the first and second character rectangles composing the unified character rectangle, deleting the first and second character rectangles from the group of the character rectangles reproduced by the character rectangle producing means, and adding the unified character rectangle to the group of the character rectangles, a unified black-pixel mass about which the unified character rectangle is circumscribed being classified into one character group by the character pattern classifying means, and a unified character image of the unified black-pixel mass being recognized as a character by the character recognizing means; and image displaying means for displaying the character images of the black-pixel masses, which are extracted from the document image by the character rectangle producing means and are recognized by the character recognizing means as the characters, to reproduce the document.

Also, the object is achieved by the provision of a method for recognizing a character written in a document, comprising the steps of:

reading an image of the document to obtain a document image indicated by a plurality of black pixels and a plurality of white pixels;

extracting a plurality of black-pixel masses, respectively composed of a plurality of black pixels connected with each other, from the document image;

producing a plurality of character rectangles respectively circumscribed about one black-pixel mass;

comparing a plurality of character images of the black-pixel masses with each other;

classifying one or more black-pixel masses, of which character images have the same character pattern, into a character group for each character pattern to classify each of the black-pixel masses into one of the character patterns;

determining a representative character image of a representative black-pixel mass representing the character images of the black-pixel masses classified into the same character group, for each of the character groups;

detecting a figure feature of the representative character image of each representative black-pixel mass;

preparing a plurality of referential figure features of a plurality of referential character patterns each of which expresses a character;

comparing one figure feature of one representative character image with each of the referential figure features of the referential character patterns for each of the figure features;

detecting a particular referential character pattern as a character pattern agreeing with one representative character image for each of the representative character images in cases where a particular referential figure feature of the particular referential character pattern agrees with the figure feature of the representative character image;

recognizing each of one or more character images of one or more black-pixel masses classified into the character group, which corresponds to the representative character image agreeing with the particular referential character pattern, as a character expressed by the particular referential character pattern;

selecting a first character rectangle and a second character rectangle from the character rectangles, on condition that either a first character image of a first black-pixel mass about which the first character rectangle is circumscribed or a second character image of a second black-pixel mass about which the second character rectangle is circumscribed is not recognized as any character and the first and second character rectangles are close to each other within a predetermined character distance;

unifying the first and second character rectangles to a unified character rectangle circumscribed about the first and second black-pixel masses while maintaining positions of the first and second character rectangles composing the unified character rectangle;

adding the unified character rectangle to a group of the character rectangles produced in the step of producing a plurality of character rectangles;

adding the unified black-pixel mass to a group of the black-pixel masses extracted from the document image in the step of extracting a plurality of black-pixel masses;

classifying a unified black-pixel mass, about which the unified character rectangle is circumscribed, into a separating character group;

detecting a referential separating character pattern as a character pattern agreeing with a separating character image of the unified black-pixel mass in cases where a referential figure feature of the referential separating character pattern agrees with a figure feature of the separating character image;

recognizing a unified character image of the unified black-pixel mass as a character expressed by the referential separating character pattern; and displaying the character images of the black-pixel masses including the unified character image of the unified black-pixel mass, which are extracted from the document image in the step of extracting a plurality of black-pixel masses and are recognized as the characters in the step of recognizing each of one or more character images or the step of recognizing a unified character image, on an image displaying unit to reproduce the document.

In the above configuration and steps, an image of a document in which a plurality of characters are written is read by the image reading means, and a binary document image is obtained. Therefore, a plurality of character images are indicated by a plurality of character images expressed by a plurality of black pixels. Thereafter, a plurality of black-pixel masses, each of which is composed of a plurality of black pixels connected with each other, are extracted from the document image, and a plurality of character rectangles respectively circumscribed about one black-pixel mass are produced in the character rectangle producing means.

Thereafter, one or more black-pixel masses, of which the character images have the same character pattern, are classified into a character group in the character pattern classifying means, so that all black-pixel masses extracted by the character rectangle producing means are respectively classified into one of a plurality of character groups. Thereafter, a representative character image of a representative black-pixel mass representing the character images of the black-pixel masses classified into the same character group is determined by the representative character image determining means for each of the character groups, and a figure feature of each representative character image is detected by the figure feature detecting means.

Thereafter, each of the character images of the black pixels groups is recognized as a character in the character recognizing means. That is, one figure feature of one representative character image is compared with each of referential figure features of a plurality of referential character patterns stored in the referential figure feature storing means for each of the figure features of the representative character images, a particular referential character pattern is detected as a character pattern agreeing with one representative character image for each of the figure features of the representative character images in cases where a particular referential figure feature of the particular referential character pattern agrees with the figure feature of the representative character image, and each of the character images of the black-pixel masses classified into the character group, which corresponds to the representative character image agreeing with the particular referential character pattern, is recognized as a character expressed by the particular referential character pattern. Because each of alphabets other than two separating characters "i" and "j" is indicated by a mass of black pixels connected with each other, a character image of the black-pixel mass indicating one alphabet other than two separating characters can be recognized as a character.

In contrast, in cases where any referential figure feature of the referential character pattern does not agree with the figure feature of the representative character image, each of the character images of the black-pixel masses classified into the character group corresponding to the representative character image is not recognized as a character. For example, because each of the separating characters "i" and "j" is not indicated by a mass of black pixels connected with each other, the separating character is not indicated by a single black-pixel mass but indicated by a first black-pixel mass and a second black-pixel mass. Therefore, a character image of the first or second black-pixel mass indicating one portion of the separating character is not recognized as a character by the character recognizing means. To recognize a unified character image of the first and second black-pixel masses as one separating character, a first character rectangle circumscribed about the first black-pixel mass and a second character rectangle circumscribed about the second black-pixel mass are unified by the character rectangle unifying means.

In detail, the first character rectangle and the second character rectangle respectively circumscribed about a character image of the first or second black-pixel mass which is not recognized as any character by the character recognizing means are selected by the character rectangle unifying means on condition that the first and second character rectangles are close to each other within a predetermined character distance, and the first and second character rectangles are unified to a unified character rectangle circumscribed about the first and second black-pixel masses while maintaining positions of the first and second character rectangles composing the unified character rectangle.

For example, because each of the separating characters "i" and "j" is indicated by a first mass of black pixels connected with each other and a second mass of black pixels connected with each other, either a first character image of a first black-pixel mass denoting the first mass of black pixels or a second character image of a second black-pixel mass denoting the second mass of black pixels does not indicate any character, so that either the first character image of the first black-pixel mass or the second character image of the second black-pixel mass is not recognized as any character. However, because a first character rectangle circumscribed the first black-pixel mass and a second character rectangle circumscribed the second black-pixel mass are close to each other within the predetermined character distance, in cases where a unified character rectangle obtained by unifying the first and second black-pixel masses is produced by the character rectangle unifying means, a unified character image of a unified black-pixel mass composed of the first and second black-pixel masses is recognized as a character by the character recognizing means.

Thereafter, the characters recognized by the character recognizing means are displayed by the image displaying means, so that the document is reproduced.

Accordingly, even though a noise exists in a position close to a non-separating character such as "a", "b" or the like, because one character rectangle circumscribed about the non-separating character is not circumscribed about the noise, the non-separating character can be accurately and reliably recognized on condition that the recognition of the non-separating character is not disturbed by the noise.

Also, because a unified character rectangle circumscribed about a pair of black-pixel masses, which are caused by two portions of one separating character "i" or "j", is produced by the character rectangle unifying means and a unified character image of a unified black-pixel mass of the unified character rectangle is recognized as a character by the character recognizing means, even though the separating character is written in the document, the separating character can be accurately and reliably recognized, and the document can be reliably reproduced. Also, even though a noise exists in a position close to the non-separating character, because a pair of character rectangles relating to the non-separating characters are selected on condition that the pair of character rectangles are close to each other within a predetermined character distance, the separating character can be accurately and reliably recognized on condition that the recognition of the separating character is not disturbed by the noise.

It is preferred that the apparatus further comprise:

word rectangle detecting means for reading out the character rectangles produced by the character rectangle producing means, detecting a region between each pair of character rectangles adjacent to each other as an inter-word space in cases where a distance between each pair of character rectangles adjacent to each other is longer than a predetermined character distance, detecting a region between each pair of character rectangles adjacent to each other as an inter-character space in cases where a distance between each pair of character rectangles adjacent to each other is equal to or shorter than the predetermined character distance, and detecting one character rectangle placed between two inter-word spaces or a plurality of character rectangles which are serially arranged through one or more inter-character spaces and are placed between two inter-word spaces as a word rectangle;

word storing means for storing a plurality of words; and word and character confirming means for specifying a series of black-pixel masses about which the word rectangle detected by the word rectangle detecting means is circumscribed, collating a series of characters, which is indicated by a series of character images of the series of black-pixel masses recognized by the character recognizing means, with a spelling of each word stored in the word storing means, and confirming the series of characters as a particular word having a particular spelling in cases where the series of characters matches with the particular spelling of the particular word, and confirming each of the characters as a confirmed character according to the particular spelling in cases where the series of characters is confirmed, the character images of the black-pixel masses which indicate the confirmed characters being displayed by the image displaying means.

In the above configuration, a distance between a pair of characters belonging to different words is longer than the predetermined character distance, and a distance between a pair of characters belonging to the same word is equal to or shorter than the predetermined character distance. Therefore, an inter-word space between each pair of character rectangles belonging to different words is detected, and one or more character rectangles placed between a pair of inter-word spaces are detected as a word rectangle in the word rectangle detecting means.

Thereafter, a series of characters of a series of black-pixel masses about which the word rectangle is circumscribed is collated with a spelling of each word stored in the word storing means. In cases where the series of characters matches with a particular spelling of a particular word, the series of characters is confirmed as the particular word having the particular spelling, and each of the characters is confirmed as a confirmed character according to the particular spelling by the word and character confirming means.

Therefore, not only each of the character images of the black-pixel masses is recognized as a character by the character recognizing means but also each of the characters recognized by the character recognizing means is confirmed by the word and character confirming means, and the confirmed characters are displayed by the image displaying means.

Accordingly, the character written in the document can be more accurately reproduced.

It is also preferred that the apparatus further comprise:

noise removing means for selecting a third character rectangle reproduced by the character rectangle producing means, on condition that a third character image of a third black-pixel mass about which the third character rectangle is circumscribed is not recognized as any character by the character recognizing means and the third character rectangle is not unified with any character rectangle by the character rectangle unifying means, judging that the third character image of the third black-pixel mass is a noise in cases where the third character rectangle exists in a position placed in an upper or lower direction of a fourth character rectangle which is circumscribed about a fourth character image of a fourth black-pixel mass recognized as a character by the character recognizing means, and removing the third character rectangle from a group of the character rectangles produced by the character rectangle producing means.

In the above configuration, in cases where a character image of a black-pixel mass about which the third character rectangle is circumscribed is not recognized as a character and the third character rectangle is not unified with any character rectangle, it is assumed that the character image of the black-pixel mass is a noise. However, because a period, a comma or the like is usually written in the document, in cases where the third character rectangle exists in a position placed in an upper or lower direction of a fourth character rectangle relating to a recognized character image, the third character rectangle is removed from a group of the character rectangles.

Therefore, there is no probability that a noise is erroneously recognized as a portion of a character or the noise is displayed by the image displaying means. It is also preferred that the apparatus further comprise:

character rectangle combining means for selecting a third character rectangle circumscribed about a third black-pixel mass and a fourth character rectangle circumscribed about a fourth black-pixel mass from a group of the character rectangles reproduced by the character rectangle producing means, on condition that the third and fourth character rectangles are included in the word rectangle detected by the word rectangle detecting means and the third and fourth character rectangles are placed in a rectangular character area having a predetermined character width and a predetermined character height, in cases where the series of characters relating to the word rectangle is not confirmed by the word and character confirming means, combining the third and fourth character rectangles to a combined character rectangle while making the third and fourth character rectangles contact each other, deleting the third and fourth character rectangles from the group of the character rectangles reproduced by the character rectangle producing means, and adding the combined character rectangle to the group of the character rectangles, a second word rectangle including the combined character rectangle being detected by the word rectangle detecting means, a second series of characters relating to the second word rectangle is confirmed by the word and character confirming means as a second particular word having a second particular spelling in cases where the second series of characters matches with the second particular spelling of the second particular word, and a plurality of character images of a plurality of black-pixel masses about which the second word rectangle is circumscribed being displayed by the image displaying means.

In the above configuration, in cases where a character "d" is erroneously recognized as a character "c" and a character "l" and a third character rectangle circumscribed about a third image of the character "c" and a fourth character rectangle circumscribed about a fourth image of the character "l" are produced in the character rectangle producing means, though the third and fourth images are recognized as the characters "c" and "l", a series of characters relating to a word rectangle in which the third and fourth character rectangles are included is not confirmed as any word. In this case, the third and fourth character rectangles are combined to a combined character rectangle while making the third and fourth character rectangles contact each other on condition that the third and fourth character rectangles are placed in a rectangular character area having a predetermined character width and a predetermined character height. Therefore, an image corresponding to the combined character rectangle is recognized as a character "d", and a series of characters corresponding to a word rectangle including the combined character rectangle can be confirmed as a word.

Accordingly, even though a character "d" is erroneously recognized as a character "c" and a character "l", the document can be correctly reproduced.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of method and apparatus for recognizing a character according to the present invention are described with reference to drawings.

Figure 1:
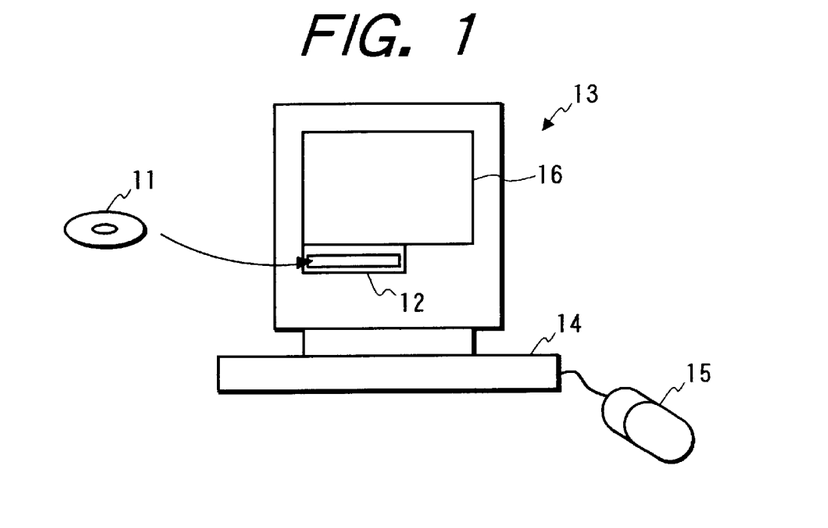
FIG. 1 shows a computer system in which a method for recognizing a plurality of characters written in a document is performed.

FIG. 1 shows a computer system in which a method for recognizing a plurality of characters in a document is realized.

As shown in FIG. 1, a software program for embodying a method for recognizing a plurality of characters is stored in a recording medium 11 such as an optical medium, a magnetic medium, a photo-electro-magnetic medium. For example, a CD-ROM or CDR is used as the recording medium 11. The recording medium 11 is inserted into a driving unit 12 of a computer system 13 such as a personal computer, and the software program recorded in the recording medium 11 is installed in the personal computer 13 by manipulating a keyboard 14 and/or a mouse 15. Thereafter, the software program is executed, and a document image of recognized and unrecognized characters read by a scanner (not shown) is displayed on a displaying unit 16.

Figure 2:
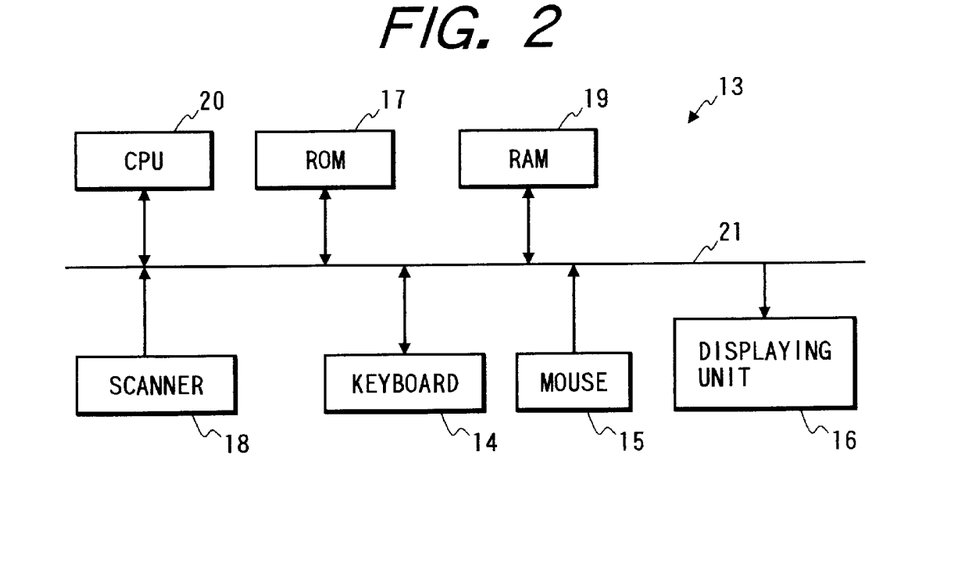
FIG. 2 is a block diagram of a hardware of the computer system 13.

FIG. 2 is a block diagram of a hardware of the computer system 13.

As shown in FIG. 2, the computer system 13 comprises a read only memory (ROM) 17 for storing the software program installed in the computer system 13 and a control program, the keyboard 14, the mouse 15, the displaying unit 16, a scanner 18 for reading a document, a random access memory (RAM) 19 for storing a binary document image obtained by reading the document and various pieces of data obtained by executing the software program, a central processing unit (CPU) 20 for controlling the operation of the computer system 13, and a bus 21 connecting the ROM 17, the RAM 19, the CPU 20, the scanner 18, the keyboard 14, the mouse 15 and the displaying unit 16.

Figure 3:
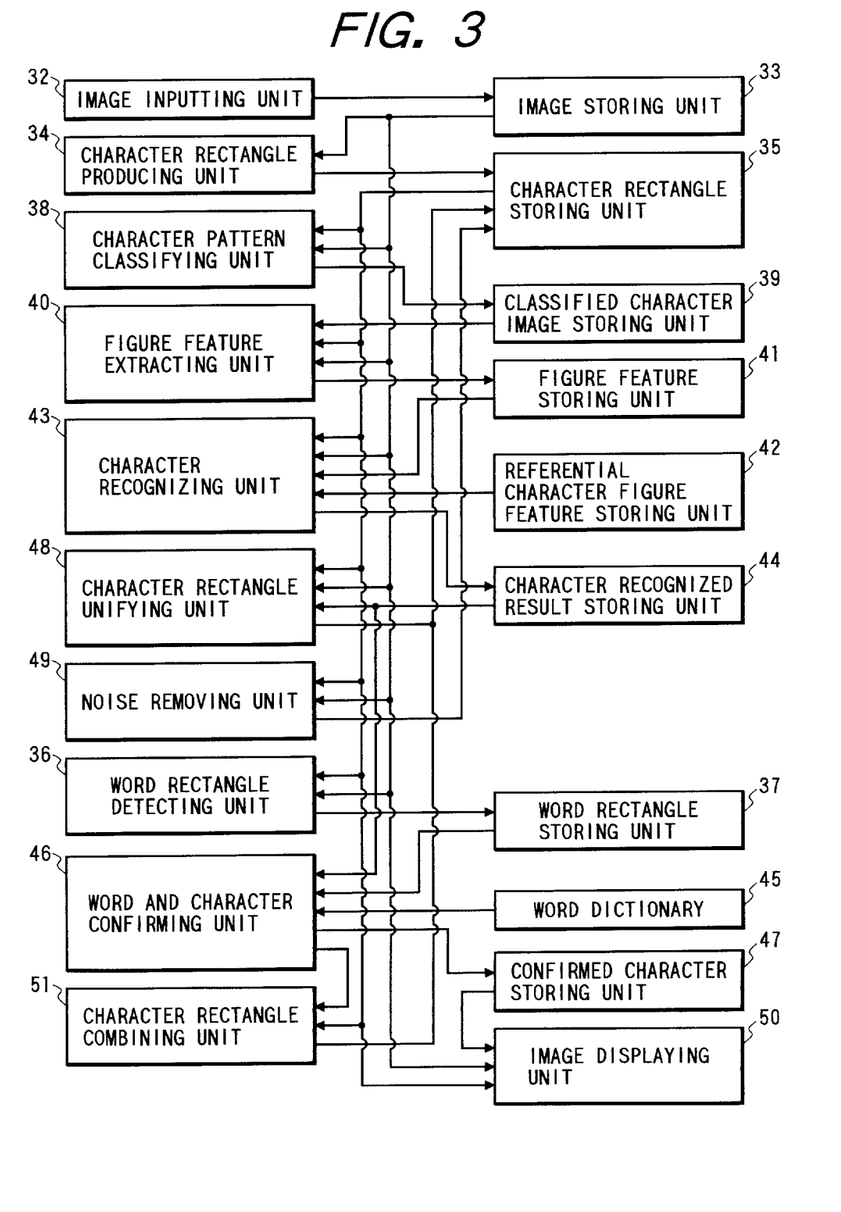
FIG. 3 is a functional block diagram of a character recognizing apparatus according to embodiments of the present invention.

FIG. 3 is a functional block diagram of a character recognizing apparatus according to embodiments of the present invention.

As shown in FIG. 3, a character recognizing apparatus 31 comprises a plurality of units as follows.

An image input unit 32 is embodied by the scanner 18. The unit 32 reads an image of a document to input a binary document image composed of a plurality of white and black pixels.

An image storing unit 33 is accommodated in the RAM 19. The unit 19 stores the binary document image input by the image input unit 32.

A character rectangle producing unit 34 is accommodated in the CPU 20. The unit 34 produces a plurality of character rectangles which are respectively circumscribed about a mass of successive black pixels connected with each other (hereinafter, called a "black-pixel mass") in the binary document image stored in the image storing unit 33, and the unit 34 calculates a position of each character rectangle and a size of each character rectangle.

A character rectangle storing unit 35 is accommodated in the RAM 19. The unit 35 stores coordinate data (the position and the size) of each character rectangle calculated by the character rectangle producing unit 34, and the unit 35 stores a plurality of character rectangle numbers which are serially numbered and respectively identify one character rectangle to substantially store the character rectangles.

A character pattern classifying unit 38 is accommodated in the CPU 20. First, the unit 38 specifies an image of each black-pixel mass representing one unrecognized character as a character image according to the binary document image stored in the binary document image storing unit 33 and the coordinate data (the positions and sizes) of the character rectangles stored in the character rectangle storing unit 35. Secondly, central positions of all character images are placed at the same position, and the unit 38 overlaps each pair of character images with each other to compare the character images with each other. Thirdly, the unit 38 judges whether or not each pair of character images indicate the same character pattern by calculating a ratio of the number of overlapped black pixels in one character image to the number of all black pixels in the same character image. Fourthly, the unit 38 classifies each of the character images in the character rectangles into one of a plurality of character patterns respectively denoting a pattern of one unrecognized character to classify one or more character images indicating the same character pattern into the character pattern. Fifth, the unit 38 classifies one or more character rectangles corresponding to one or more character images indicating the same character pattern into one group for each character pattern.

A classified character image storing unit 39 is accommodated in the RAM 19. The unit 39 stores a group of character rectangle numbers identifying one or more character rectangles classified into the same group by the character pattern classifying unit 38 for each group in a list form on condition that a plurality of character image group numbers serially numbered are respectively identify one group of character rectangle numbers.

A figure feature extracting unit 40 is accommodated in the CPU 20. The unit 40 reading the groups of character rectangle numbers stored in the classified character image storing unit 39, and the unit 40 reads out the positions and sizes of the character rectangles specified by the groups of character rectangle numbers from the character rectangle storing unit 35. Then the unit 40 extracts a plurality of character images classified into the same character pattern by the character pattern classifying unit 38 from the image storing unit 33 according to the positions and sizes of the character rectangles. Further, the unit 40 determines one of the character images classified into the same character pattern as a representative character image having a representative character pattern. Finally, the unit 40 extracts a figure feature of the representative character image for each character pattern according to the black-pixel mass corresponding to the representative character image.

A figure feature storing unit 41 is accommodated in the RAM 19. The unit 41 stores the figure features of the representative character images extracted by the figure feature extracting unit 40.

A referential character figure feature storing unit 42 is accommodated in the RAM 19. The unit 42 stores a plurality of referential figure features of a plurality of referential characters.

A character recognizing unit 43 is accommodated in the CPU 20. The unit 43 reads out the groups of character rectangle numbers, which identifies one group of character rectangles indicating one group of character images classified into the same character pattern by the character pattern classifying unit 38, from the classified character image storing unit 39, and the unit 43 specifies the character rectangles represented by each representative character image according to the groups of character rectangle numbers. Then, the unit 43 compares one figure feature of one representative character image stored in the figure feature storing unit 41 and each of the referential figure features of the referential characters stored in the referential character figure feature storing unit 42 for each representative character image, and the unit 43 recognizes the representative character image as a character indicated by a particular referential character in cases where a difference between the figure feature of the representative character image and a particular referential figure feature of the particular referential character is smaller than a predetermined value. Next, the unit 43 allocates the recognized character to a group of recognized character rectangles represented by the representative character image in cases where the representative character image is recognized as one character, and the unit 43 allocates character recognized information and indicates that one recognized character is allocated to one character rectangle, to each of the recognized character rectangles. Then the unit 43 allocates character unrecognized information, indicating that any recognized character is not allocated to one character rectangle, to a group of unrecognized character rectangles to which any recognized character is not allocated, in cases where a difference between the figure feature of the representative character image and the referential figure feature of each referential character is larger than the predetermined value.

A character recognized result storing unit 44 is accommodated in the RAM 19. The unit 44 stores each recognized character and the character recognized information allocated by the character recognizing unit 43 in connection with the recognized character rectangles, and the unit 44 stores the character unrecognized information allocated by the character recognizing unit 43 in connection with the unrecognized character rectangles.

A character rectangle unifying unit 48 is accommodated in the CPU 20. The unit 48 reads out coordinate data (a positions and a size) of a first unrecognized character rectangle and coordinate data (a positions and a size) of a second unrecognized character rectangle, which are connected with the character unrecognized information stored in the character recognized result storing unit 44, from the character rectangle storing unit 35 on condition that the first and second unrecognized character rectangles are positioned in a rectangular character area having a predetermined X directional character width and a predetermined Y directional character height. Then, the unit 48 unifies the first and second unrecognized character rectangles to produce a unified character rectangle. Coordinate data of the unified character rectangle is stored in the character rectangle storing unit 35 in place of the coordinate data of the first and second unrecognized character rectangles. The unified character rectangle is processed in the character pattern classifying unit 38, the figure feature extracting unit 40 and the character recognizing unit 43 to judge whether the unified character rectangle is a recognized character rectangle or an unrecognized character rectangle. A recognized character and character recognized information are stored in connection with the unified character rectangle in the character recognized result storing unit 44 in cases where it is judged by the character recognizing unit 43 that the unified character rectangle is a recognized character rectangle.

A noise removing unit 49 is accommodated in the CPU 20. The unit 49 reads out a position and size of an unrecognized character rectangle, which is not judged as a recognized character rectangle even though a unifying operation is performed in the character rectangle unifying unit 48, from the character rectangle storing unit 35, and the unit 49 judges that a black-pixel mass about which the unrecognized character rectangle is circumscribed is a noise in cases where the unrecognized character rectangle exists in a position placed in the upper or lower direction of a recognized character rectangle. Finally, the unit 49 removes the character rectangle number of the unrecognized character rectangle judged as the noise from the character rectangle storing unit 35.

A word rectangle detecting unit 36 is accommodated in the CPU 20. The unit 36 calculates a distance in the X direction between each pair of recognized character rectangles adjacent to each other according to the positions and sizes of the character rectangles stored in the character rectangle storing unit 35. Then, the unit 36 detects a region between the recognized character rectangles adjacent to each other at the distance longer than a predetermined character distance as an inter-word space. Further, the unit 36 detects a region between one pair of recognized character rectangles adjacent to each other at the distance equal to or shorter than the predetermined character distance as an inter-character space, and the unit 36 detects one recognized character rectangle placed between two inter-word spaces or a plurality of recognized character rectangles which are serially arranged through one or more inter-character spaces and are placed between two inter-word spaces as a word rectangle circumscribed about a word.

A word rectangle storing unit 37 is accommodated in the RAM 19. The unit 37 stores a group of character rectangle numbers identifying a group of recognized character rectangles detected as one word rectangle by the word rectangle detecting unit 36 for each word rectangle to substantially store each word rectangle.

A word dictionary 45 is accommodated in the RAM 19. The unit 45 stores an English spelling of each of a plurality of words.

A word and character confirming unit 46 is accommodated in the CPU 20. The unit 46 reads out a series of character rectangle numbers identifying a group of recognized character rectangles detected as one word rectangle from the word rectangle storing unit 37 for each word rectangle. Then, the unit 46 reads out a series of character recognized results for the group of recognized character rectangles detected as one word rectangle from the character recognized result storing unit 44 to obtain a series of characters for each word rectangle, and the unit 46 collates the series of characters with each English spelling stored in the word dictionary 45 for each word rectangle. Then, the unit 46 judges whether or not each series of recognized characters corresponding to one word rectangle matches with one English spelling, and the unit 46 confirms the word rectangle in cases where the series of recognized characters corresponding to the word rectangle matches with a particular English spelling indicating the particular word. Then, the unit 46 confirms each of the recognized characters corresponding to the word rectangle.

A confirmed character storing unit 47 is accommodated in the RAM 19. The unit 47 stores each of the recognized characters confirmed by the word and character confirming unit 46 as a confirmed character.

A character rectangle combining unit 51 is accommodated in the CPU 20. The unit 51 reads coordinate data (a position and a size) of a pair of recognized character rectangles included in the word rectangle from the character rectangle storing unit 35, on condition that the pair of recognized character rectangles are positioned in one rectangular character area having the predetermined X directional character width and the predetermined Y directional character height, in cases where the word rectangle is not confirmed by the word and character confirming unit 46, and the unit 51 combines the pair of recognized character rectangles to a combined character rectangle while making the pair of recognized character rectangles contact each other. Coordinate data of the combined character rectangle is stored in the character rectangle storing unit 35 in place of the coordinate data of the pair of recognized character rectangles. The combined character rectangle is processed in the character pattern classifying unit 38, the figure feature extracting unit 40 and the character recognizing unit 43 to judge whether the combined character rectangle is a recognized character rectangle or an unrecognized character rectangle. A recognized character and character recognized information are stored in connection with the combined character rectangle in the character recognized result storing unit 44 in cases where it is judged by the character recognizing unit 43 that the combined character rectangle is a recognized character rectangle.

An image display processing unit 50 embodied by the displaying unit 16. The unit 50 reads out coordinate data of a plurality of character rectangles which are circumscribed about the confirmed characters stored in the confirmed character storing unit 47, and the unit 50 reads out a plurality of character images specified by the coordinate data of the character rectangles from the image storing unit 33. Further, the unit 50 displays the character images to reproduce the recognized document.

In the above configuration, an operation of the character recognizing apparatus 31 according to a first embodiment is described with reference to FIG. 4.

Figure 4:
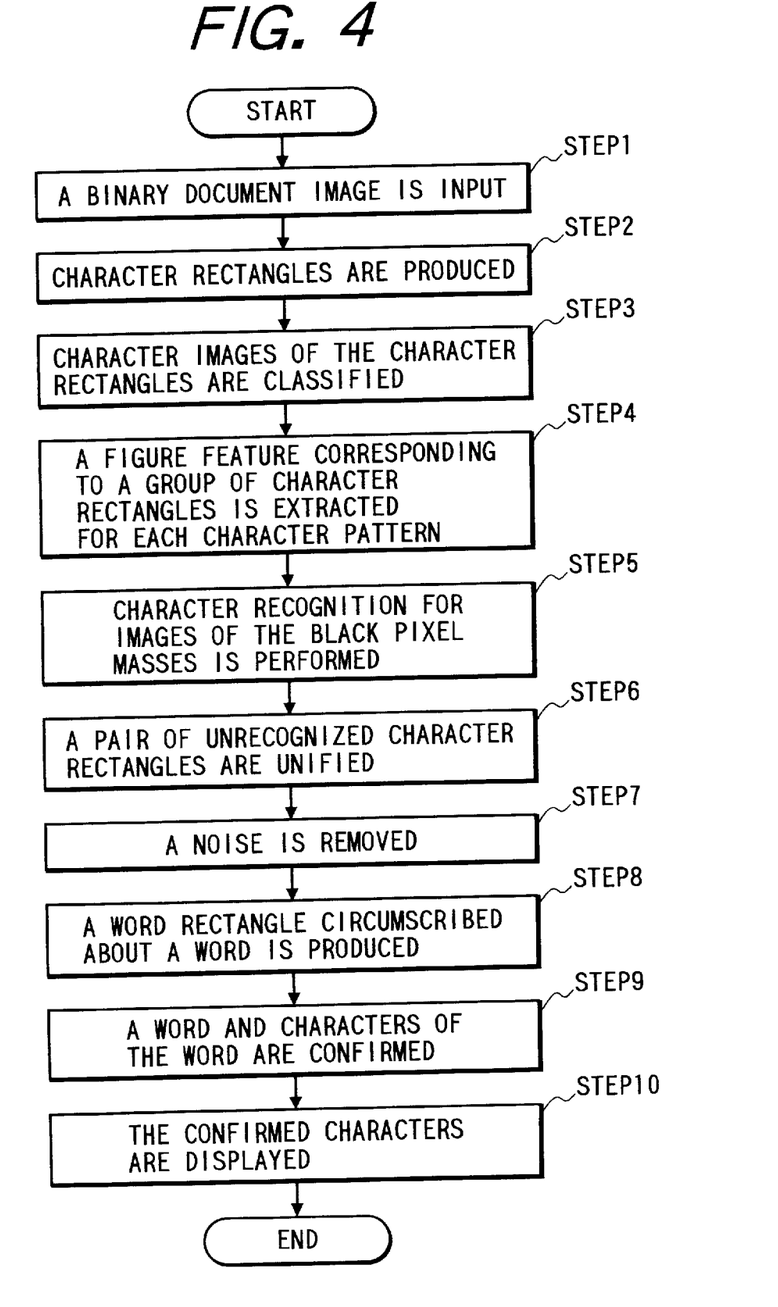
FIG. 4 is a flow chart showing an operational procedure of the character recognizing apparatus 31 according to a first embodiment.

FIG. 4 shows a flow chart in an operational procedure of the character recognizing apparatus 31 according to a first embodiment.

As shown in FIG. 4, a recognized document is read by the image input unit 32 to input a binary document image composed of a plurality of white and black pixels, and the binary document image is stored in the image storing unit 33 (step 1). An example of the binary document image is shown in FIG. 5. That is, a binary document image expressing a series of three words "apple grape pine" is shown as an example.

Figure 6:
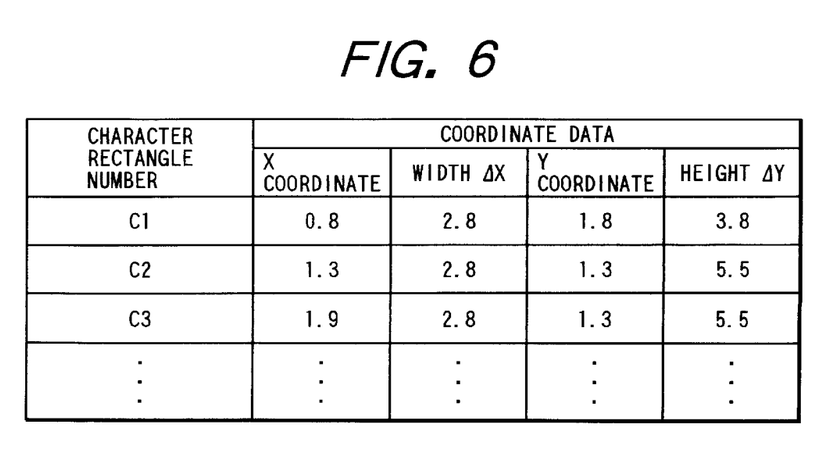
FIG. 6 shows coordinate data (positions and sizes) of a plurality of character rectangles stored in a character rectangle storing unit shown in FIG. 3.

Thereafter, a plurality of character rectangles are produced and coordinate data (positions and sizes) of the character rectangles are calculated in the character rectangle producing unit 34 (step 2). In detail, a plurality of black-pixel masses each of which is composed of a mass of black pixels connected with each other in the binary document image are detected, and a character rectangle circumscribed about one black-pixel mass is produced for each black-pixel mass. Also, a position (an X coordinate and a Y coordinate in the binary document image) of each character rectangle and a size (a width $\Delta X$ in an X direction and a width $\Delta Y$ in a Y direction) of each character rectangle are calculated. Coordinate data (the positions and sizes) of the character rectangles and a plurality of character rectangle numbers serially numbered to identify the character rectangles are stored in the character rectangle storing unit 35. For example, as shown in FIG. 6, a plurality of character rectangle numbers C1 to C16 identifying a plurality of character rectangles shown in FIG. 5 and coordinate data of the character rectangles are stored in the character rectangle storing unit 35 in a table form. The coordinate data of one character rectangle is composed of an X coordinate, an X directional width ΔX, a Y coordinate and a Y directional height ΔY.

Thereafter, character images of black-pixel masses in the character rectangles are classified into a plurality of character patterns in the character pattern classifying unit 38 (step 3). In detail, the coordinate data of the character rectangles are read out from the character rectangle storing unit 35, an image of each black-pixel mass is extracted from the binary document image stored in the binary document image storing unit 33 according to each of the coordinate data, each image representing one unrecognized character is treated as a character image, and all character images are overlapped with each other. In this case, a center of each character image is, for example, positioned at the same position to compare the character images with each other. Thereafter, a ratio of the number of overlapped black pixels in one character image to the number of all black pixels in the one character image is calculated each time one pair of character images are overlapped with each other, and it is judged whether or not each two of character images indicate the same character pattern. That is, in cases where the ratio is higher than a predetermined matching ratio, it is judged that two of character images indicate the same character pattern. Thereafter, all character images are classified into a plurality of character patterns respectively denoting a pattern of one unrecognized character.

The judgement whether or not two of character images indicate the same character pattern is described with reference to FIG. 7.

Figure 7:
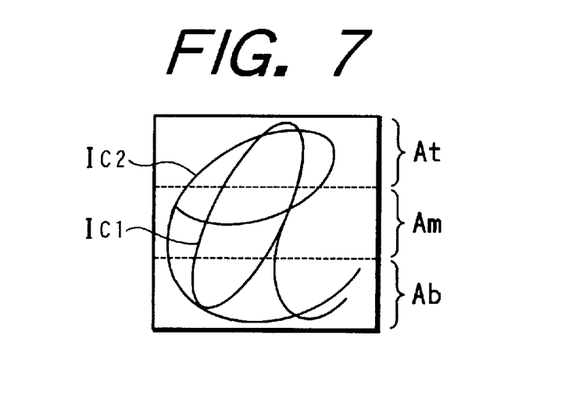
FIG. 7 shows a pair of character images overlapped with each other in a rectangular area to perform

As shown in FIG. 7, a first character image Ic1 representing a character "a" and a second character image Ic2 representing a character "e" are overlapped with each other in a rectangular area. The rectangular area is, for example, divided into a top area At, a middle area Am and a bottom area Ab. A first matching ratio of the number of overlapped black pixels to the number of black pixels in the first (or second) character image is calculated in the top area At, a second matching ratio of the number of overlapped black pixels to the number of black pixels in the first character image is calculated in the middle area Am, and a third matching ratio of the number of overlapped black pixels to the number of black pixels in the first character image is calculated in the bottom area Ab. In cases where the first, second and third matching ratios are respectively close to 1, the first and second character images Ic1 and Ic2 are recognized as the same character image.

In this case, because each character rectangle is circumscribed about one black-pixel mass, though the character rectangles C15 and C16 are close to each other, it is judged that the character image corresponding to the character rectangle C15 is recognized as the same as that corresponding to the character rectangles C5 and C10, so that the character rectangle C15 is classified into the group of character rectangles into which the character rectangles C5 and C10 are classified. Also, it is recognized that the character image corresponding to the character rectangle C16 differs from the character images corresponding to the other character rectangles C1 to C15, so that only the character rectangle C16 belongs to one group.

In general, even though a first character rectangle and a second character rectangle are close to each other, a first character image corresponding to the first character rectangle is classified into a first character pattern regardless of a second character image corresponding to the second character rectangle (step 3), and the second character image corresponding to the second character rectangle is classified into a second character pattern regardless of the first character image corresponding to the first character rectangle (step 3).

Therefore, there is no probability that the first character rectangle circumscribed about a first black-pixel mass and the second character rectangle circumscribed about a second black-pixel mass are undesirably unified to a third character rectangle circumscribed about the first black-pixel mass and the second black-pixel mass and a third character pattern corresponding to the third character rectangle is classified into a third character pattern different from the first and second character patterns. That is, in cases where the first character rectangle is circumscribed about the first character image representing a first character, it can be prevented that he third character image corresponding to the third character rectangle is not recognized as any character.

Figure 8:
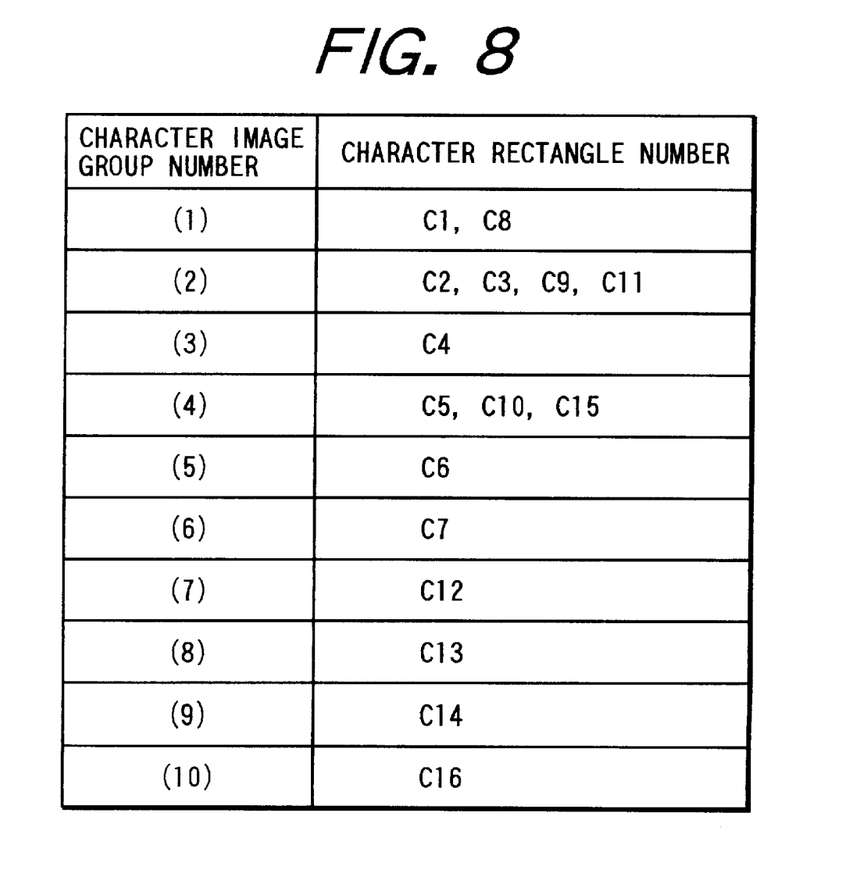
FIG. 8 shows a plurality of groups of character rectangle numbers stored in a classified character image storing unit shown in FIG. 3, each group of character rectangle numbers identifying one or more character rectangles corresponding to one or more character images classified into the same character pattern.

Thereafter, as shown in FIG. 8, one or more character rectangles corresponding to one or more character images classified into the same character pattern are classified into one group, and one or more character rectangle numbers identifying the character rectangles classified into the same group are stored in the classified character image storing unit 39 for each group in a list form. In this case, each group of character rectangle numbers is identified by one of a plurality of character image group numbers serially numbered.

Thereafter, a figure feature of a group of character images corresponding to a group of character rectangles classified into the same character pattern is extracted in the figure feature extracting unit 40 for each character pattern in a step 4. In detail, the groups of character rectangle numbers stored in the classified character image storing unit 39 are read out, the positions and sizes of the character rectangles specified by each group of character rectangle numbers are read out from the character rectangle storing unit 35, and a group of character images of one group of the character rectangles specified by one group of character rectangle numbers is extracted from the image storing unit 33 according to the positions and sizes of the character rectangles for each group of character rectangle numbers. Each group of character images agrees with a group of images classified into the same character pattern by the character pattern classifying unit 38. Thereafter, one of the character images in each group is determined as a representative character image having a representative character pattern, and a figure feature of each representative character image is extracted by examining a figure of the black-pixel mass corresponding to the representative character image. The figure features of the representative character images are stored in the figure feature storing unit 41.

Thereafter, a character recognition is performed in the character recognizing unit 43 in a step 5. In detail, one figure feature of one representative character image stored in the figure feature storing unit 41 and each of the referential figure features of the referential characters stored in the referential character figure feature storing unit 42 are compared with each other for each representative character image. Also, the groups of character rectangle numbers, which identifies one group of character rectangles indicating one group of character images classified into the same character pattern by the character pattern classifying unit 38, are read out from the classified character image storing unit 39, and one or more character rectangles represented by each representative character image are specified according to the positions and sizes of the character rectangles specified by each group of character rectangle numbers. In cases where a difference between the figure feature of one representative character image and a particular referential figure feature of a particular referential character is smaller than a predetermined value, the representative character image is recognized as a character indicated by the particular referential character, and the recognized character is allocated to the character rectangles represented by the representative character image. Each of the character rectangles to which the recognized character is allocated is called a recognized character rectangle. Also, character recognized information indicating that one character image of one character rectangle is recognized as one character is allocated to the recognized character rectangles. In contrast, in cases where a difference between the figure feature of one representative character image and one referential figure feature of each referential character is larger than the predetermined value, character unrecognized information indicating that one character image of one character rectangle is not recognized as any character is allocated to the character rectangles represented by the representative character image. Each of the character rectangles to which any recognized character is not allocated and the character unrecognized information is allocated is called an unrecognized character rectangle.

Figure 9:
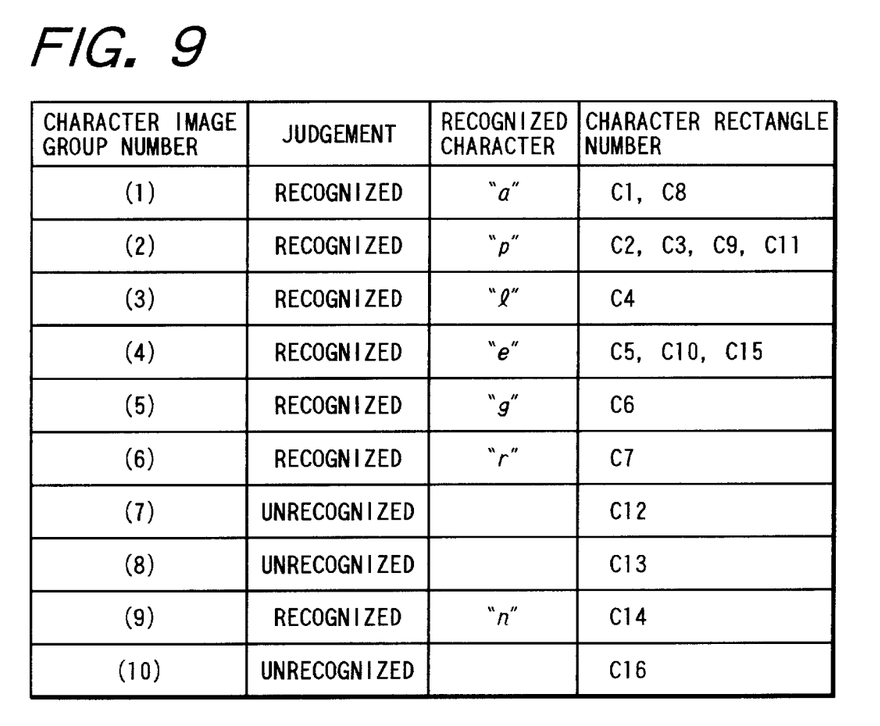
FIG. 9 shows a plurality of recognized or unrecognized characters stored in a character recognized result storing unit shown in FIG. 3 in connection with a plurality of groups of character rectangle numbers.

Thereafter, as shown in FIG. 9, each recognized character and the character recognized information are stored in the character recognized result storing unit 44 in connection with the character rectangle numbers indicating the recognized character rectangles. Also, the character unrecognized information is stored in the character recognized result storing unit 44 in connection with the character rectangle numbers indicating the unrecognized character rectangles.

Thereafter, a pair of unrecognized character rectangles are unified in the character rectangle unifying unit 48 in a step 6 to produce a unified character rectangle circumscribed about a separating character such as "i" or "j". In detail, the unrecognized character rectangles stored in the character recognized result storing unit 44 are specified according to the character unrecognized information, and coordinate data (positions and sizes) of the unrecognized character rectangles are read out from the character rectangle storing unit 35. Thereafter, each pair of unrecognized character rectangles closest to each other are unified to produce a unified character rectangle, and coordinate data (positions and sizes) of the unified character rectangle is stored in the character rectangle storing unit 35. In this case, it is required that each pair of unrecognized character rectangles are positioned in a rectangular character area having a predetermined X directional character width and a predetermined Y directional character height. The predetermined Y directional character height is, for example, equal to a height of the character "l" or "p".

For example, as shown in FIG. 9, because the character rectangles C12, C13 and C16 are unrecognized, a pair of unrecognized character rectangles C12 and C13 are unified. Therefore, a unified character rectangle C17 circumscribed about a unified character image "i" is produced.

Figure 10:
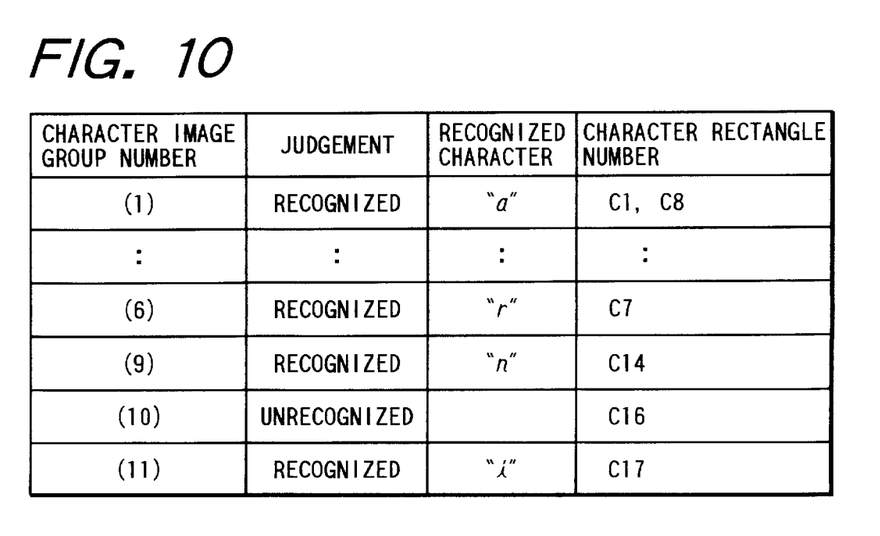
FIG. 10 shows a plurality of recognized or unrecognized characters stored in the character recognized result storing unit on condition that an unrecognized character unifying operation is performed in a character rectangle unifying unit shown in FIG. 3.

Thereafter, coordinate data of the unified character rectangle and a character rectangle number identifying the unified character rectangle are stored in the character rectangle storing unit 35, a unified character image of the unified character rectangle is classified into a unified character pattern in the character pattern classifying unit 38, a figure feature of the unified character image is extracted in the figure feature extracting unit 40, and it is judged in the character recognizing unit 43 whether the unified character rectangle is a recognized character rectangle or an unrecognized character rectangle. For example, because the unified character rectangle C17 is circumscribed about the unified character image "i", it is judged that the unified character rectangle is a recognized character rectangle, and the unified character image of the unified character rectangle C17 is recognized as a separating character "i". Thereafter, the recognized character "i" and the character recognized information are stored in the character recognized result storing unit 44 in connection with the unified character rectangle C17 (FIG. 10). Therefore, the character rectangle C16 is only treated as the unrecognized character rectangle because any unconfirmed character rectangle does not exist with the character rectangle C16 in the rectangular character area having the predetermined character width and the predetermined character height.

Thereafter, a noise is removed in the noise removing unit 49 in a step 7. In detail, coordinate data (a position and a size) of an unrecognized character rectangle, which is not judged as a recognized character rectangle even though a unifying operation is performed in the character rectangle unifying unit 48, is read out from the character rectangle storing unit 35, and it is judged whether or not a recognized character rectangle exists in a position placed in the upper or lower direction of the unrecognized character rectangle. In cases where it is judged that the unrecognized character rectangle exists in a position placed in the upper or lower direction of a recognized character rectangle, it is judged that a black-pixel mass about which the unrecognized character rectangle is circumscribed is a noise, and the character rectangle number of the unrecognized character rectangle judged as the noise removed from the character rectangle storing unit 35 to substantially remove the unrecognized character rectangle from the character rectangle storing unit 35. For example, the unrecognized character rectangle C16 exists in a position placed in the lower direction of the recognized character rectangle C15, the coordinate data of the unrecognized character rectangle C16 is deleted from the character rectangle storing unit 35.

Therefore, because a period ".", a comma "," or the like is not placed in the upper or lower direction of a recognized character rectangle, any period, comma or the like is not removed.

Thereafter, a word rectangle circumscribed about a word is produced in the word rectangle detecting unit 36 in a step 8. In detail, a distance in the X direction between each pair of character rectangles adjacent to each other is calculated according to the coordinate data (the positions and sizes) of the character rectangles stored in the character rectangle storing unit 35, a region between one pair of character rectangles adjacent to each other at the distance longer than a predetermined character distance is detected as an inter-word space, a region between one pair of character rectangles adjacent to each other at the distance equal to or shorter than the predetermined character distance is detected as an inter-character space, and one character rectangle placed between two inter-word spaces or a plurality of character rectangles which are serially arranged through one or more inter-character spaces and are placed between two inter-word spaces is detected as a word rectangle circumscribed about a word.

Figure 11:
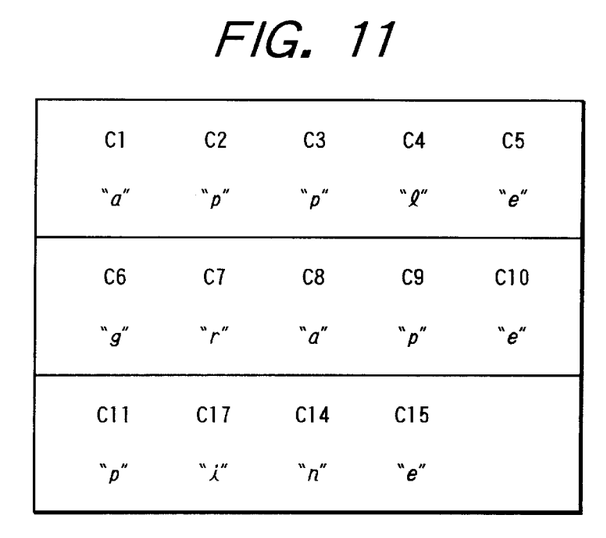
FIG. 11 shows a plurality of groups of character rectangle numbers stored in a word rectangle storing unit shown in FIG. 3, each groups of character rectangle numbers identifying a group of character rectangles detected as one word rectangle.

Thereafter, as shown in FIG. 11, a group of character rectangle numbers identifying a group of character rectangles detected as one word rectangle is stored in the word rectangle storing unit 37 for each word rectangle.

Thereafter, a word about which one word rectangle is circumscribed and one or more recognized characters about which the word rectangle is circumscribed are confirmed in the word and character confirming unit 46 in a step 9. In detail, a series of character rectangle numbers identifying a group of character rectangles detected as one word rectangle is read out from the word rectangle storing unit 37 for each word rectangle, a series of recognized characters corresponding to the group of character rectangles detected as one word rectangle is read out from the character recognized result storing unit 44 for each word rectangle, the series of recognized characters is collated with each English spelling stored in the word dictionary 45 for each word rectangle, and it is judged whether or not each series of recognized characters matches with one English spelling. In cases where one series of characters corresponding to the word rectangle matches with a particular English spelling indicating a particular word, a word about which the word rectangle is circumscribed is confirmed, and one or more recognized character about which the word rectangle is circumscribed are confirmed. Thereafter, confirmation information "confirmed", one recognized character and one or more character rectangle number are stored in the confirmed character storing unit 47 for each character image group number.

Figure 12:
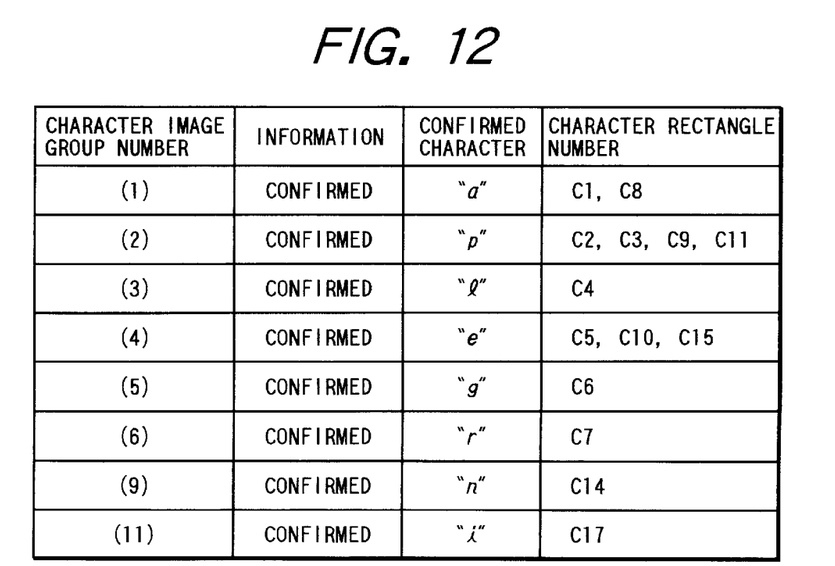
FIG. 12 shows a plurality of confirmed characters stored in a confirmed character storing unit shown in FIG. 3 in connection with a plurality of groups of character rectangle numbers.

For example, as shown in FIG. 11, a first word rectangle composed of the recognized character rectangles C1 to C5 is circumscribed about a series of recognized characters "apple", a second word rectangle composed of the recognized character rectangles C6 to C10 is circumscribed about a series of recognized characters "grape", and a third word rectangle composed of the recognized character rectangles C11, C14, C15 and C17 is circumscribed about a series of recognized characters "pine". Because the English spellings "apple", "grape" and "pine" are stored in the word dictionary 45, the first word rectangle, the second word rectangle and the third word rectangle are confirmed, and the recognized characters corresponding to the recognized character rectangles C1 to C11, C14, C15 and C17 are confirmed. Therefore, as shown in FIG. 12, each of the recognized characters corresponding to the recognized character rectangles C1 to C11, C14, C15 and C17 are stored in the confirmed character storing unit 47 as a confirmed character.

Thereafter, a plurality of character images corresponding to the confirmed characters stored in the confirmed character storing unit 47 are read out from the image storing unit 33, and are displayed on the image display processing unit 50 for each word specified by the word rectangle substantially stored in the word rectangle storing unit 37 (step 10), so that the recognized document is reproduced.

Next, a second embodiment is described.

In cases where a character "d" is not accurately (or clearly) written in a document, there is a case that the character "d" is erroneously input by the image storing unit 33 as a first black-pixel mass indicating a first character image "c" and a second black-pixel mass indicating a second character image "l". In this case, the first character image is classified into the character pattern denoting a pattern of one recognized character "c" in the character pattern classifying unit 38. Also, the second character image is classified into the character pattern denoting a pattern of another recognized character "l". Therefore, a first recognized character "c" and character recognized information are stored in the character recognized result storing unit 44 in connection with a first recognized character rectangle circumscribed about the first black-pixel mass. Also, a second recognized character "l" and character recognized information are stored in the character recognized result storing unit 44 in connection with a second recognized character rectangle circumscribed about the second black-pixel mass. However, in cases where the character "d" is, for example, used in a word "dream" in the document, The word "dream" is erroneously read out as an unconfirmed word "clream". Therefore, a word rectangle circumscribed about the unconfirmed word "clream" is not confirmed in the word and character confirming unit 46 because the series of recognized characters corresponding to the word rectangle does not match with any English spelling. In this case, none of the recognized characters "c", "l", "r", "e", "a" and "m" of the unconfirmed word "clream" is stored in the confirmed character storing unit 47, so that neither a series of characters "dream" nor the series of recognized characters "clream" is displayed on the image display processing unit 50.

To prevent the above drawback in the second embodiment, in cases where a word rectangle composed of a plurality of recognized character rectangles is not confirmed in the word and character confirming unit 46, a pair of recognized character rectangles positioned in one rectangular character area having the predetermined X directional character width and the predetermined Y directional character height are combined to a combined character rectangle in the character rectangle combining unit 51 shown in FIG. 3 while making each pair of recognized character rectangles contact each other, coordinate data (a position and a size) of the combined character rectangle is stored in the character rectangle storing unit 35 in place of coordinate data of the pair of recognized character rectangles changed to the combined character rectangle.

In this case, even though the character "d" written in the word "dream" is erroneously input as a first character "c" and a second character "l", because a pair of recognized character rectangles circumscribed about the first and second characters "c" and "l" are positioned in one rectangular character area having the predetermined X directional character width and the predetermined Y directional character height, the pair of recognized character rectangles are combined to a combined character rectangle circumscribed about the character "d" while making the pair of recognized character rectangles contact each other. Therefore, a word rectangle composed of a plurality of character rectangles which are circumscribed about the characters "d", "r", "e", "a" and "m" are confirmed in the word and character confirming unit 46, and a series of characters "dream" is displayed on the image display processing unit 50.

Accordingly, even though the character "d" is not clearly written in the document to be erroneously input as a first character "c" and a second character "l", the character "d" is correctly recognized, and a word including the character "d" can be reliably displayed on the image display processing unit 50.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. An apparatus for recognizing a character written in a document comprising:

character rectangle producing means for extracting a plurality of black-pixel masses, respectively composed of a plurality of black pixels connected with each other, from an image of the document indicated by a plurality of black pixels and a plurality of white pixels and producing a plurality of character rectangles respectively circumscribed about one black-pixel mass;

character pattern classifying means for comparing character images of the black-pixel masses, about which the character rectangles produced by the character rectangle producing means are circumscribed, with each other, and classifying one or more black-pixel masses, of which the character images have the same character pattern, into a character group for each character pattern to classify the black-pixel masses extracted by the character rectangle producing means into the character patterns;

representative character image determining means for determining one of the character images of the black-pixel masses classified into the same character pattern by the character pattern classifying means as a representative character image of a representative black-pixel mass having a representative character pattern for each of the character patterns;

figure feature detecting means for detecting a figure feature of one representative character image of one representative black-pixel mass determined by the representative pattern determining means, for each of the representative character patterns;

referential figure feature storing means for storing a plurality of referential figure features of a plurality of referential character patterns which each express a character;

character recognizing means for comparing one figure feature of one representative character image detected by the figure feature detecting means with each of the referential figure features of the referential character patterns stored in the referential figure feature storing means for each of the figure features of the representative character images, recognizing the representative character image as a particular character expressed by a particular referential character pattern selected from the referential character patterns for each of the representative character images in cases where a particular referential figure feature of the particular referential character pattern agrees with the figure feature of the representative character image and recognizing each of the character images of the black-pixel masses classified into one character pattern, which corresponds to one representative character image recognized as one particular character, as the particular character for each of the character patterns;

noise removing means for selecting a specific character rectangle from the character rectangles producing means on condition that a specific character image of a specific black-pixel mass, about which the specific character rectangle is circumscribed, is not recognized as any character by the character recognizing means, removing the specific character rectangle as a noise from the group of the character rectangles produced by the character rectangle producing means in cases where the specific character rectangle exists in a position placed in an upper or lower direction of one character rectangle which is circumscribed about one character image of one black-pixel mass recognized as one particular character by the character recognizing means;

word rectangle detecting means for reading out the character rectangles produced by the character rectangle producing means in which the specific character rectangle removed by the noise removing means is not included, detecting a region between each pair of character rectangles adjacent to each other as an inter-word space in cases where a distance between the pair of character rectangles adjacent to each other is longer than a predetermined character distance, detecting a region between each pair of character rectangles adjacent to each other as an inter-character space in cases where a distance between the pair of character rectangles adjacent to each other is equal to or shorter than the predetermined character distance, and detecting one character rectangle placed between two inter-word spaces or a plurality of character rectangles which are serially arranged through one or more inter-character spaces and are placed between two inter-word spaces as a word rectangle;

word storing means for storing a plurality of words;

word and character confirming means for specifying a series of black-pixel masses about which the word rectangle detected by the word rectangle detecting means is circumscribed collating a series of characters, which is indicated by a series of character images of the series of black-pixel masses recognized by the character recognizing means, with a spelling of each word stored in the word storing means, and confirming the series of characters as a particular word having a particular spelling in cases where the series of characters matches with the particular spelling of the particular word, and confirming each of the characters as a confirmed character in cases where the characters are confirmed as the particular word, further comprising:

character rectangle unifying means for selecting a first character rectangle and a second character rectangle from the group of the character rectangles produced by the character rectangle producing means, on condition that either a first character image of a first black-pixel mass about which the first character rectangle is circumscribed or a second character image of a second black-pixel mass about which the second character rectangle is circumscribed is not recognized as any character by the character recognizing means and the first and second character rectangles are placed in a rectangular character area, unifying the first and second character rectangles to a unified character rectangle circumscribed about the first and second black-pixel masses while maintaining positions of the first and second character rectangles composing the unified character rectangle, deleting the first and second character rectangles from the group of the character rectangles produced by the character rectangle producing means, and adding the unified character rectangle to the group of the character rectangles, a unified black-pixel mass, about which the unified character rectangle is circumscribed, being classified into a unified character pattern by the character pattern classifying means for each unified black-pixel mass, one of unified character images of the unified black-pixel masses classified into the same unified character pattern being determined by the representative character image determining means as a representative unified character image of a representative unified black-pixel mass, and the unified character images of the unified black-pixel masses being recognized as one particular character by the character recognizing means.

* * * * *